CLEANING MACHINE

Original Filed Feb. 24, 1969 2 Sheets-Sheet 1

INVENTORS
CHARLES R. HOWERIN
MARION W. HUMPHREYS
BY
John H. Oltman

CLEANING MACHINE

Original Filed Feb. 24, 1969 2 Sheets-Sheet 2

INVENTORS
CHARLES R. HOWERIN
MARION W. HUMPHREYS
BY
John H. Oltman

United States Patent Office

Re. 27,792
Reissued Oct. 30, 1973

27,792
CLEANING MACHINE

Charles R. Howerin, 1631 NE. 57th St., Fort Lauderdale, Fla. 33308, and Marion W. Humphreys, deceased, late of Fort Lauderdale, Fla., by Mrs. Marion W. Humphreys, executrix, Fort Lauderdale, Fla.; said Humphreys assignor to said Howerin Original No. 3,605,169, dated Sept. 20, 1971, Ser. No. 801,432, Feb. 24, 1969. Application for reissue Dec. 30, 1971, Ser. No. 214,493
Int. Cl. A47l 7/00, 13/26
U.S. Cl. 15—321 3 Claims

Matter enclosed in heavy brackets [ ] appears in the original patent but forms no part of this reissue specification; matter printed in italics indicates the additions made by reissue.

ABSTRACT OF THE DISCLOSURE

A cleaning machine which is particularly useful for cleaning carpets. A preferred embodiment of the machine includes a head for directing a cleaning liquid such as water or an aqueous cleaning solution onto a carpet or the like and for withdrawing soil and excess liquid from the carpet and supplying it to a chamber which contains a filter. A blower may be utilized to suck the excess liquid and soil into the chamber or tank for containing liquid. The liquid is forced through the filter, for example by means of a pump, and the filter acts to remove contaminants from the liquid. The clean liquid flows from the exhaust side of the filter through a flow circuit back to the head where it is directed against the carpet, for example as a spray. A heater is provided to raise the temperature of the liquid so that it is very hot when sprayed, thereby improving its cleaning action. Thus, the machine involves a combination of recirculation, filtering and heating providing good cleaning and high efficiency.

BACKGROUND OF THE INVENTION

It is known to provide a type of cleaning machine which has a head through which hot water or steam is directed onto a carpet and also through which excess water or steam is withdrawn from the carpet; see for example U.S. Pats. 3,262,146 and 2,908,030. In the machine described in the former patent, a problem is encountered in that separate liquid and condensate tanks are employed in a manner which requires that the liquid supply tank be refilled relatively often. In the latter patent, recirculation of liquid is employed which reduces refilling requirements, but contamination of the liquid is a problem. The present invention proposes to employ recirculation of liquid, filtering of the liquid, and heating of the liquid to provide a highly efficient system in which neither contamination nor refilling are substantial problems. This system also employs heat to raise the temperature of the liquid, either before or after filtering, so that the liquid as directed against a carpet is very hot, thereby promoting good cleaning action. It is believed that no recirculating hot liquid system employing a filter in this manner has been proposed, although Pat. No. 2,574,731 discloses a recirculating air system which does not employ heat nor direct filtering of liquid in the main recirculation path.

SUMMARY OF THE INVENTION

One embodiment of the invention is a single tank cleaning machine having a filter mounted in the tank in a manner such that the tank can be filled with cleaning liquid such as water or a water solution to a level above the filter. A blower is used to reduce the pressure in the space above the liquid inside the tank. A pump is provided to pump liquid from the discharge side of the filter out of the tank and through a flow circuit to a head from which the liquid is sprayed onto a carpet or the like. Excess liquid and soil is sucked from the carpet by the blower and returned through a flow circuit to the space in the tank above the stored liquid. Thus, liquid is constantly recirculated. A heater is provided either in this tank or in a separate tank which is part of the flow circuit leading to the cleaning head for heating the liquid to a temperature providing good cleaning action. Where the liquid is water, the temperature may be in the vicinity of 180–190° F., although the invention is not limited to this temperature range. Preferably, a portion of the liquid being pumped out of the main supply tank is tapped off from the discharge flow circuit and returned to the tank in a manner to cause the stored liquid in the tank to swirl so as to keep contaminants concentrated near the outside of the tank away from the filter, as will be described more fully hereinafter. This increases the useful filtering cycle of the filter so that it does not have to be rejuvenated or replaced as often.

The circulation of liquid from the discharge side of the filter through a cleaning head with excess liquid being returned to the intake side of the filter in a storage tank or chamber not only conserves cleaning fluid, but also assures good filtering action. The heating of the liquid can be accomplished in a simple manner with this system. Filtering prevents clogging or other deterioration of the machine and allows efficient recirculation as described above. The feedback to cause swirling in the storage tank or chamber helps to increase the length of the filtering cycle before rejuvenation or replacement is required. Rejuvenation may be accomplished by the use of a second tank having an air cushion therein for forcing liquid backwards through the filter, as will be described hereinafter.

Accordingly, it is an object of the present invention to provide an improved cleaning machine in which recirculation, filtering and heat are employed in combination.

Another object of the invention is to provide a cleaning machine which greatly reduces refilling requirements.

Another object of the invention is to provide a cleaning machine which effectively removes contamination from a recirculation liquid.

A further object of the invention is to provide a cleaning machine in which heating of a recirculating filtered liquid can be accomplished efficiently.

Another object of the invention is to provide a cleaning machine in which feedback or bypassing of liquid is employed to increase the effectiveness of a filter.

Another object of the invention is to provide a cleaning machine in which rejuvenation of filter can be accomplished readily.

Among the other objects of the invention are to provide a carpet cleaning machine which is economical, efficient, rugged, and capable of being manufactured on a mass production basis.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
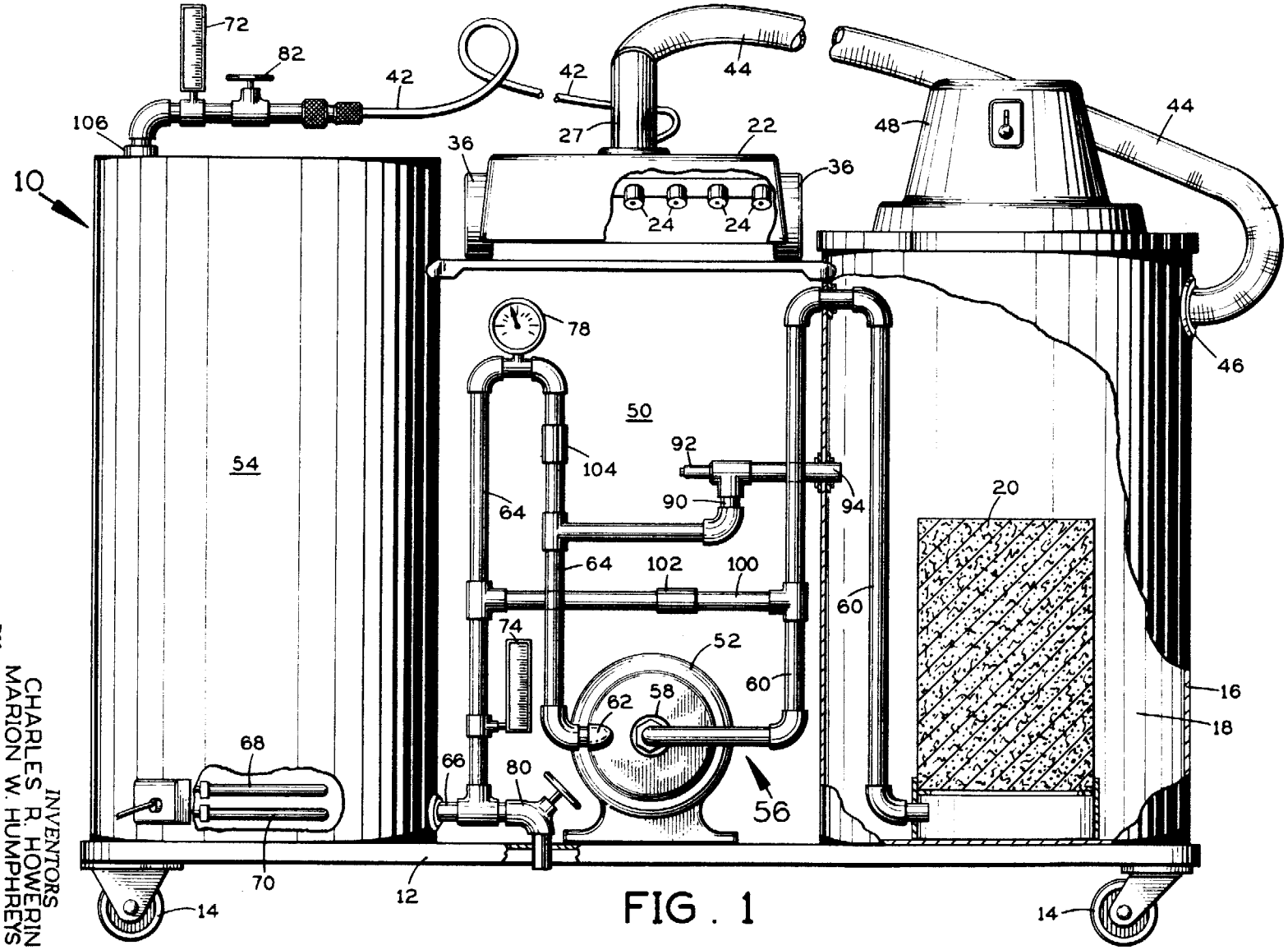
FIG. 1 is an elevational view of a two-tank carpet cleaning machine in accordance with one embodiment of the invention.

As shown on the drawings:

A cleaning machine 10 for cleaning carpets or the like is shown in FIG. 1, and this cleaning machine is a two-tank embodiment of the invention. The machine 10 includes a support base 12 mounted on floor engaging wheels 14 which enable the machine to be rolled about as a carpet or other object is being cleaned. Mounted at the right hand end of the support base 12 as viewed in FIG. 1 is a tank 16 which forms a chamber 18 for containing cleaning liquid. The cleaning liquid may be water or a solution of water and a cleaning chemical or chemicals if desired. A filter 20 for liquids is retained in the chamber 18, and this particular filter is a hollow, cylindrical tube having closed top and bottom ends. The filter is sufficiently porous to allow liquid to pass through it, but blocks the flow of contaminants such as dirt and other soil which may be removed from a carpet. The outside of the cylinder 20 is its intake side and the inside of the cylinder 20 is its discharge side. The filter is mounted relative to the chamber such that liquid can flow under pressure from the portion of the chamber on the intake side of the filter through the filter to the portion of the chamber on the inside or discharge side of the filter. A cloth filter or a filter of special material may be used if desired. The bottom end of the cloth or cloth-like portion of the tubular filter may be open to communicate with piping as shown.

It may be noted that the filter 20 need not be cylindrical. For example, it might be a flat disk type of filter retained transversely across the chamber 18 with its intake side facing up and its discharge side facing down. Such a filter might be dome-shaped with the convex side directed upwardly.

Figure 2:
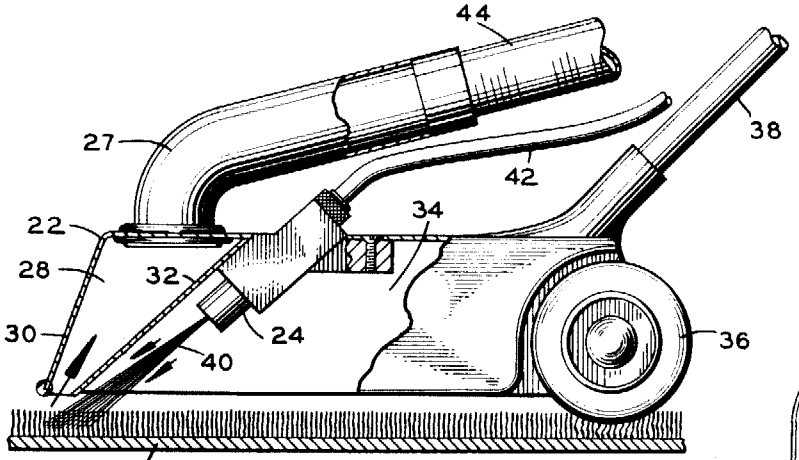
FIG. 2 is an elevational view, partly in section, of a cleaning head utilized in the machine of FIG. 1.

The machine 10 also includes a cleaning head 22 which is shown both in FIG. 1 and also in FIG. 2. The cleaning head has nozzles 24 mounted in it providing a discharge flow path for directing liquid forcibly against a carpet or the like 26 as shown in FIG. 2. The head 22 also includes a tubular fixture 27 which communicates with a space 28 within the head to provide a return flow path for withdrawing excess liquid and soil from the carpet 26 under the influence of suction applied to the tube 27 as will be described. The head 22 has a shell 30 which is divided tranversely by a slanting partition 32 so as to separate the space 28 from the space 34 in which the nozzles 24 are mounted. The head 22 is mounted on floor-engaging wheels 36, and the head may be manipulated by means of a handle 38.

In operation, the handle 38 may be pushed down to raise the head 22 off the carpet 26 slightly in the manner shown in FIG. 2 so that the head 22 may be pushed forward with the head raised. During this forward movement of the head, suction is applied but no spray of liquid is directed onto the carpet. At the end of the forward stroke of the head, the handle 38 is raised slightly to lower the head 22 onto the carpet, and then the head is pulled to the rear while the spray 40 is turned on by means of a control valve (not shown) provided in the conduit 42 connected to nozzles 24. During this rearward stroke of the head, suction which has been applied to the tube 27 sucks excess liquid and soil from the carpet into the tube for return to the chamber 18.

The tube 27 is connected to the portion of the chamber 18 on the intake side of the filter 40 by a flexible conduit 44. This conduit 44 enters the tank 16 at a point 46 just above the normal liquid level provided in the tank 18. In other words, the tank 18 should be filled with cleaning liquid to a point just below the intake point 46. The conduit 44 constitutes a return liquid flow circuit for returning liquid and soil to the tank 16. Means is provided either in this return flow circuit or in association with the intake portion of the chamber 18 to apply suction to the tube 27 and to cause liquid to flow from the tube 27 back to the tank. In the embodiment illustrated in FIG. 1, this flow producing means is a vacuum blower 48 which may be of the centrifugal type. The blower 48 communicates with the space above the inlet point 46, and in operation produces reduced pressure or vacuum in the latter space so as to suck liquid and soil from the tube 27 into the intake portion of the tank 18.

A discharge liquid flow circuit designated generally as 50 connects the portion of the chamber on the discharge side (the inside) of filter 20 with the nozzles 24. In the embodiment illustrated in FIG. 1, this discharge flow circuit includes a pump 52, a second tank 54, a conduit 42 and suitable piping as shown generally at 56. The pump 52 may have a self-contained electric motor or a separate motor as desired. The intake 58 of the pump 52 is connected by piping 60 to the discharge side of filter 20, the pipe 60 entering through filter 20 at its lower end as shown in FIG. 1. The outlet 62 of pump 52 is connected by piping 64 to the tank 54 at an inlet 66 near the bottom of the tank. Two electrical heater elements 68 and 70 are mounted inside the tank 54 near its bottom end for heating the cleaning liquid in tank 54 to a temperature which is sufficiently high that when the liquid is sprayed from the nozzles 24 onto the carpet 26 as shown in FIG. 2, it will provide effective cleaning. Where the cleaning liquid is water, it may be heated by heating elements 68 and 70 to a temperature of about 180–190° F. The heating elements 68 and 70 are energized electrically by means of a circuit shown in FIG. 3 which will be described later. The liquid partially fills the tank 54 and is pumped by pump 52 through conduit 42 to the discharge nozzles 24 where it is sprayed onto the carpet 26. Thermometers 72 and 74 are provided in the piping as a pressure gauge 78. Other gauges may be provided if needed. A valve 80 is provided at inlet 66 and may be opened for purposes of draining the tank 54. A valve 82 is provided in conduit 42 for controlling the flow of liquid therein. As previously mentioned, an on-off control valve is provided on the handle 38 and is connected in conduit 42 for purposes of turning the spray 40 on and off as the head 22 is manipulated, this on-off valve being omitted from the drawings for lack of space.

In operation, liquid is pumped from the intake portion of tank 18 through the filter 20 where soil is removed to the discharge side of filter 20 and from there through piping 56, tank 54 and conduit 42 to the nozzles 24. Excess liquid and soil is sucked through tube 27 and conduit 44 to the inlet 46 where it enters the tank 16 and flows into the liquid stored in tank 16. Thus, the liquid is constantly recirculated and only a relatively small portion of the liquid is left in the carpet. This means that the liquid level in the tank 16 drops relatively slowly so that it is not necessary to refill the tank 16 as often as would be the case if no recirculation were provided. Sinse soil is returned to the tank 16 along with the liquid, the apparatus might become clogged if it were not for the filtering action of the filter 20 which keeps the apparatus clean, and perhaps even more important, prevents soil from flowing through the discharge flow path 50 and back to the carpet 26. The heat supplied by heating elements 68 and 70 heads the liquid sufficiently to assure good cleaning action.

It may be noted that it would be possible to provide a makeup water system for supplying makeup water to the tank 16 automatically to replace water left in the carpet. Such a makeup system is not illustrated in the drawings since it is not believed to be essential.

Tapped into the piping 64 is a feedback conduit 90 having a bypass valve 92 in it for controlling liquid flow therein. The piping 90 enters the tank 16 at an inlet 94 which is located just below the top of the normal liquid level in the tank 16. The inlet 94 is preferably at an angle relative to the wall of the tank 16 such that it approaches a tangent relationship with the circumference of the tank. When the pressure in the piping 64 builds up sufficiently, the bypass valve 92 opens to allow liquid to be fed back through piping 90 and inlet 94 into the liquid in tank 16. As the feedback liquid enters the water in the tank, it exerts force on the water causing it to swirl circularly about the circumference of the tank, and thus dirt present in the water in the tank tends to concentrate near the wall of the tank so that there is less tendency for large particles of dirt to collect on the filter 20. This means that it takes longer for the filter to become clogged than if no feedback were provided.

Also tapped into the piping 64 is a backflush path 100 having a control valve 102 therein. The path 100 communicates with pipe 60. The valve 102 may be opened and valve 104 closed when it is desired to backflush the filter 20. There is a pipe 106 connected to valve 82, and pipe 106 extends down into tank 54 a substantial distance. When liquid is pumped into tank 54, an air cushion is created at the top of the inside of tank 54. When valve 104 is closed and valve 102 is opened, the pressure of this air cushion causes liquid to be forced backwards through pipe 102 and piping 60 into the inside of filter 20 and backward through the filter 20 so as to flush contaminants out of the filter material. This rejuvenates the filter for further use. However, it may be noted that the filter 20 may be replaced rather than rejuvenated after a certain period of filtering, if desired.

Figure 3:
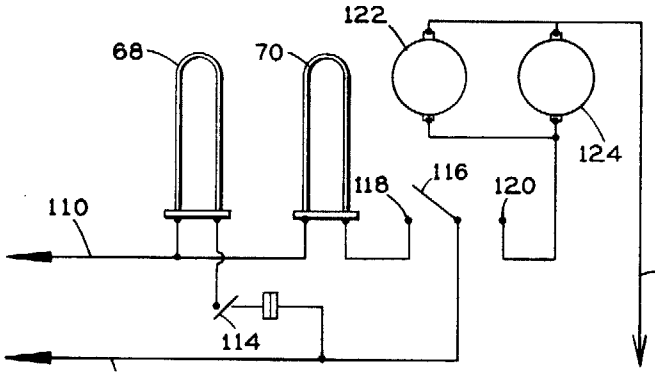
FIG. 3 is a schematic diagram of a heating circuit for the machine of FIG. 1.

A control circuit for energizing the heating elements 68 and 70 is shown in FIG. 3. Supply leads 110 and 112 are provided, and it may be seen that heating element 68 is connected across supply leads 110 and 112 through a thermostatic switch 114. Thus, heating element 68 is controlled automatically to heat the liquid in the tank 54 to a desired temperature. The other heating element 70 serves as an auxiliary heater, and is controlled by means of a switch 116 connected to supply lead 112 and to heating element 70 which in turn is connected to supply lead 110. When switch 116 is thrown to the left to make contact with fixed contact 118, the energizing circuit for heating element 70 is closed. In this condition, both heating elements are operative, and the water in tank 54 will heat up rapidly. When the water reaches the proper temperature, switch 116 may be thrown to the right to make contact with fixed contact 120 which then energizes the pump motor 122 for pump 52 and the motor 124 for vacuum blower 48. Motors 122 and 124 are connected in parallel with each other and to lead 126.

Figure 4:
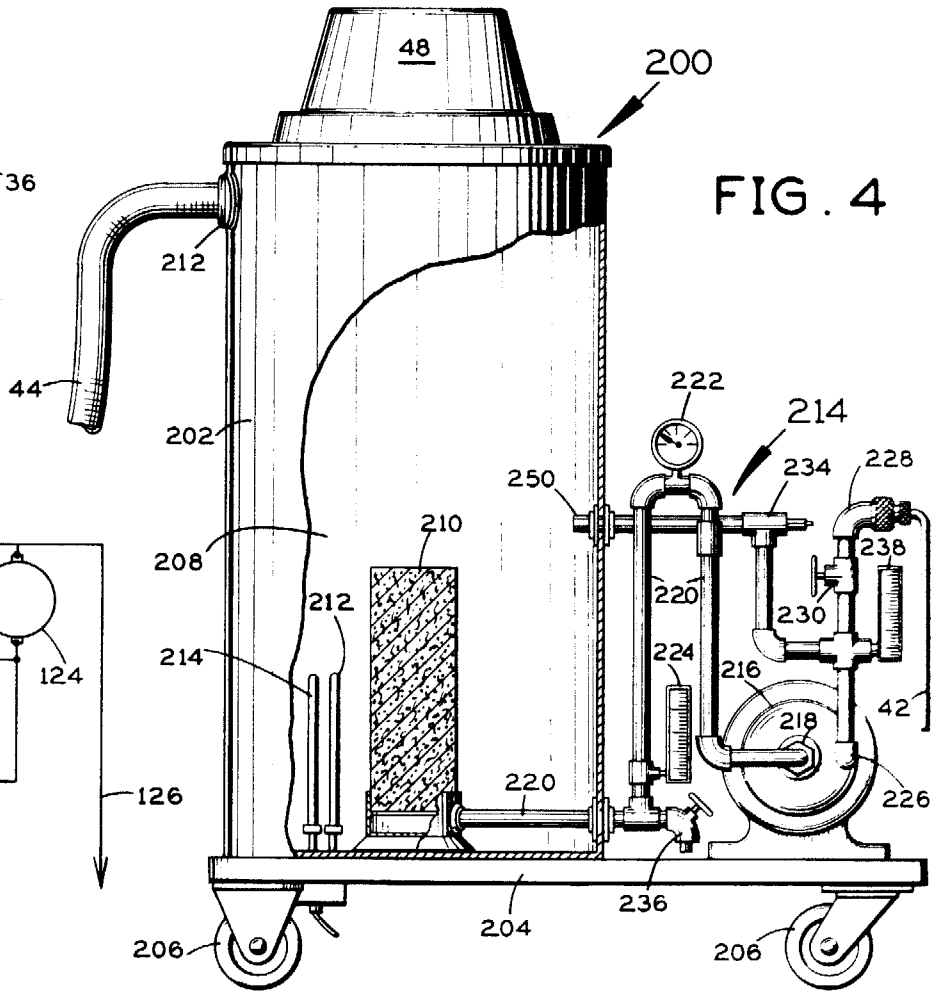
FIG. 4 is an elevational view, partly broken away, of a carpet cleaning machine in accordance with another embodiment of the invention.

FIG. 4 shows a cleaning machine 200 which is a single tank machine in accordance with another embodiment of the invention. The tank 202 is mounted on a support base 204 which in turn is mounted on floor-engaging wheels 206 to give the base 204 mobility. The tank 202 forms a chamber 208 in which a filter 210 is retained. The filter 210 is cylindrical and hollow and closed at both ends. Filter 210 is mounted in exactly the same manner as described in connection with the tank 16 of FIG. 1. The outside of filter 210 is its intake side and the inside of filter 210 is its discharge side.

Two heating elements 212 and 214 are mounted in the tank 202, and these heating elements correspond exactly to heating elements 68 and 70 described in connection with FIGS. 1 and 3 except that they are mounted in the single tank 202 rather than in a separate tank 54. The circuit for controlling the heating elements 212 and 214 may be the same as shown in FIG. 3. As previously pointed out, the filter 210 could be a circular disk type of filter extending transversely across the chamber 208 above the heating elements 212 and 214. In this case, the water in tank 202 would be heated on the discharge side of filter 210, whereas in the embodiment actually illustrated in FIG. 4 the water is heated intake side of filter 210.

The tank 202 is normally filled with liquid to a level just below an inlet 212. The inlet 212 is connected with the cleaning head 22 by a flexible conduit 44, and it will be assumed for purposes of this description that the same head 22 is used with the machine of FIG. 4 as has been described previously in connection with the machine of FIG. 1. Similarly, a vacuum blower 48 of the contrifugal type is mounted on the top of tank 202. It may be noted at this point that the top of tank 202 and also the top of tank 18 are removable to facilitate filling of the tanks. Thus, the blowers 48 are removable from the tanks. An advantage of this is that the blower and top can be placed on a separate tank when it is desired to circulate water to such a separate tank rather than to the main tank 18 or 202.

It will be assumed that the same conduit 42 is provided for connection from the tank 202 to the nozzles 24 as has been described previously. However, in FIG. 4 the conduit 42 is connected through piping 214 and a pump 216 directly to the tank 202 rather than through a separate tank 54. The inlet 218 of pump 216 is connected by piping 220 to the discharge side or inside of the filter 210. A pressure gauge 222 and a thermometer 224 are provided in this piping. The outlet 226 of pump 216 is connected by piping 228 through a valve 230 with the conduit 42. Piping 232 having a bypass valve 234 therein is connected from pipe 228 back to the tank 202 to provide a feedback path which is substantially the same as the feedback path 90 described in connection with FIG. 1. A valve 236 is provided for draining the tank 202. A thermometer 238 is provided in piping 228. Referring to FIG. 3, it may be considered that motor 124 drives the blower 48 and motor 122 drives the pump 216.

In operation, pump 216 is actuated to pump liquid from the intake side of filter 210 through the filter to the discharge side thereof and out through piping 220, pump 216, piping 230 and conduit 42 to the discharge nozzles 24 of head 22. The cleaning liquid is sprayed by the nozzles 24 onto the carpet 26. Excess liquid is sucked into tube 27 and flows through conduit 44 to the space above the liquid inside tank 202 because of suction produced by the vacuum blower 48 in this space. Soil flows with this returning liquid. The soil and recycled liquid mix with the liquid in tank 202, and the soil is filtered out by filter 210. The recirculating liquid is heated by heating elements 212 and 214 to a temperature sufficient to assure good cleaning action.

When sufficient pressure builds up in piping 228, part of the liquid pumped by pump 216 is fed back through piping 232 and valve 234 to tank 202. This liquid enters at inlet 250 which is almost tangential with respect to the circumference of tank 202, and the flow of liquid entering the tank at this angle causes the stored liquid in the tank to swirl so that heavied particles of dirt in the liquid tend to concentrate near the larger particles of dirt from clogging the filter 210 to prolong the filtering cycle. When the filter 210 does become clogged, it may be cleaned or replaced.

Thus, the invention provides a cleaning machine which provides efficient cleaning by means of a combination of recirculation, filtering and heating.

Having thus described our invention, we claim:

1. A machine for cleaning carpets or the like comprising support means, means affixed to said support means forming a chamber for containing cleaning liquid, a filter for liquids retained in said chamber and having an intake side and a discharge side, said filter being mounted relative to said chamber to filter liquid passing from said intake side to said discharge side thereof in said chamber, a cleaning head having a discharge flow path for directing liquid forcibly onto a carpet or the like and a return flow path for withdrawing excess liquid and soil from a carpet or the like, a discharge liquid flow circuit communicating a portion of said chamber on the discharge side of said filter with said discharge flow path of said head, said discharge liquid flow circuit including a tank separate from said chamber, a return liquid flow circuit communicating said return flow path of said head with a portion of said chamber on the intake side of said filter, heater means in said tank for heating cleaning liquid therein to an elevated temperature sufficiently high to assure that when said cleaning liquid is discharged from said head it is effective to clean a carpet or the like, pumping means in said discharge flow circuit for causing liquid to flow from the intake side of said filter through said filter and out from the discharge side thereof through said discharge flow circuit and said discharge flow path of said head onto a carpet or the like with sufficient force to facilitate cleaning, a back flush flow path having a valve therein and connected across said pumping means in bypassing relation therewith for feeding the liquid from said tank back to said filter for backflushing, means associated with the portion of said chamber on the intake side of said filter for sucking excess liquid and soil from a carpet or the like into said return flow path of said head and for causing the same to flow through said return flow circuit into said chamber on the intake side of said filter for flow through said filter with said filter serving to remove contaminants from said liquid, said last-named means including blower means, means to operate said pumping means and means to operate said blower means.

2. A machine for cleaning carpets or the like, comprising support means, means affixed to said support means forming a chamber for containing a cleaning liquid, said chamber comprising a hollow tank rising vertically above said support means and having a mouth at the top thereof, and a generally horizontal lid *adapted to be* removably mounted on said mouth at the top of said tank, a filter for liquids [retained in] *communicating with* said chamber and having an intake side and a discharge side, said filter [being located adjacent the bottom of said chamber] *serving* to filter liquid passing from said intake side to said discharge side thereof, [said filter terminating substantially above the bottom of said chamber and being removable from said chamber for cleaning or exchange purposes by removing said lid from said chamber to provide access to said filter, said chamber having a free and unobstructed region therein below said lid and said mouth and above said filter to allow easy access to said filter,] a cleaning head having a discharge flow path for directing liquid forcibly onto a carpet or the like and a return flow path for withdrawing excess liquid and soil from a carpet or the like, a discharge liquid flow circuit connecting a portion of said chamber [on the discharge side of said filter] with said discharge flow path of said head, *said filter being in said discharge flow circuit,* a return liquid flow circuit [connecting said return flow path of said head with said unobstructed region of said chamber below said lid], electrical heater means in [the liquid path] *said tank* for heating the cleaning liquid *in said tank* to an elevated temperature sufficiently high to assure that when said cleaning liquid is discharged from said head it is effective to clean a carpet or the like, electrical control circuit means for controlling said heater means, said heater means including first and second heater elements, and said control circuit means including a first switch connected to operate said first heater element as needed to maintain a regulated temperature in said liquid and a second switch connected to turn said second heater element on and off separately, pumping means in said discharge flow circuit for causing liquid to flow [from the intake side of said filter] through said filter and [out from the discharge side thereof] through said discharge flow circuit and said discharge flow path of said head onto a carpet or the like with sufficient force to facilitate cleaning, centrifugal blower means mounted above and on top of the lid [of said chamber above the mouth at the top of said tank], said centrifugal blower means communicating with said unobstructed region below said lid in said tank for blowing air from said tank so as to suck excess liquid and soil from a carpet or the like into said return flow path of said head and for causing the same to flow through said return flow circuit into said chamber [at the region above said filter] for subsequent flow through said filter with said filter serving to remove contaminants from said liquid, said centrifugal blower means and said lid being removable together from said chamber without detachment of any portion thereof from said blower means [(1)] to allow filling of said chamber, [(2)] to provide access to said filter,] and [(3)] to allow said lid and blower means to be placed on said mouth without interference below said lid and removed easily and placed together on a separate tank when it is desired to recirculate dirty liquid to such separate tank rather than to said chamber.

3. A machine for cleaning carpets or the like, comprising support means, means affixed to said support means forming a chamber for containing a cleaning liquid, said chamber comprising a hollow tank rising vertically above said support means and having a mouth at the top thereof, and a generally horizontal lid removably mounted on said mouth at the top of said tank, a filter for liquids retained in said chamber and having an intake side and a discharge side, said filter being located adjacent the bottom of said chamber to filter liquid passing from said intake side to said discharge side thereof, said filter terminating substantially above the bottom of said chamber and being removable from said chamber for cleaning or exchange purposes by removing said lid from said chamber to provide access to said filter, said chamber having a free and unobstructed region therein below said lid and said mouth and above said filter to allow easy access to said filter, a cleaning head having a discharge flow path for directing liquid forcibly onto a carpet or the like and a return flow path for withdrawing excess liquid and soil from a carpet or the like, a discharge liquid flow circuit connecting a portion of said chamber on the discharge side of said filter with said discharge flow path of said head, a return liquid flow circuit connecting said return flow path of said head with said unobstructed region of said chamber below said lid, electrical heater means in the liquid path for heating the cleaning liquid to an elevated temperature sufficiently high to assure that when said cleaning liquid is discharged from said head it is effective to clean a carpet or the like, electrical control circuit means for controlling said heater means, pumping means in said discharge flow circuit for causing liquid to flow from the intake side of said filter through said filter and out from the discharge side thereof through said discharge flow circuit and said discharge flow path of said head onto a carpet or the like with sufficient force to facilitate cleaning, centrifugal blower means mounted above and on top of the lid of said chamber above the mouth at the top of said tank, said centrifugal blower means communicating with said unobstructed region below said lid in said tank for blowing air from said tank so as to suck excess liquid and soil from a carpet or the like into said return flow path of said head and for causing the same to flow through said return flow circuit into said chamber at the region above said filter for subsequent flow through said filter with said filter serving to remove contaminants from said liquid, said centrifugal blower means and said lid being removable together from said chamber without detachment of any portion thereof from said blower means (1) to allow filling of said chamber, (2) to provide access to said filter, and (3) to allow said lid and blower means to be placed on said mouth without interference below said lid and removed easily and placed together on a separate tank when it is desired to recirculate dirty liquid to such separate tank rather than to said chamber, said discharge liquid flow circuit including a further tank separate from said chamber, said heater means being located in said latter separate tank, and said machine including a back flush flow path having a valve therein and connected across said pumping means in bypass relation therewith for feeding liquid from said latter tank back to said filter for back flushing.

References Cited

The following references, cited by the Examiner, are of record in the patented file of this patent or the original patent.

UNITED STATES PATENTS

| | | | |
|---|---|---|---|
| 2,292,435 | 8/1942 | Crites | 15—321 |
| 3,431,582 | 3/1969 | Grave | 15—321 |
| 2,909,800 | 10/1959 | Grindle et al. | 15—321 |

FOREIGN PATENTS

| | | | |
|---|---|---|---|
| 584,806 | 10/1959 | Canada | 15—321 |
| 1,111,899 | 5/1968 | Great Britain | 15—320 |

EDWARD L. ROBERTS, Primary Examiner

C. K. MOORE, Assistant Examiner